(12) United States Patent
Baser

(10) Patent No.: US 10,974,481 B2
(45) Date of Patent: Apr. 13, 2021

(54) PLANAR COMPOSITE MATERIAL

(71) Applicant: QUADRANT PLASTIC COMPOSITES AG, Lenzburg (CH)

(72) Inventor: Burak Baser, Aarburg (CH)

(73) Assignee: Quadrant Plastic Composites AG, Lenzburg (CH)

(*) Notice: Subject to any disclaimer, the term of this patent is extended or adjusted under 35 U.S.C. 154(b) by 0 days.

(21) Appl. No.: 15/967,724

(22) Filed: May 1, 2018

(65) Prior Publication Data
US 2018/0272654 A1    Sep. 27, 2018

Related U.S. Application Data

(63) Continuation of application No. 14/383,368, filed as application No. PCT/EP2013/054844 on Mar. 11, 2013, now abandoned.

(30) Foreign Application Priority Data

Mar. 9, 2012   (EP) .................................. 12158958

(51) Int. Cl.
*B32B 5/26* (2006.01)
*D04H 1/72* (2012.01)
(Continued)

(52) U.S. Cl.
CPC .............. *B32B 5/26* (2013.01); *B29C 70/083* (2013.01); *B29C 70/506* (2013.01); *B32B 1/00* (2013.01);
(Continued)

(58) Field of Classification Search
CPC ..... Y10T 428/24942; Y10T 428/24132; Y10T 428/24091; Y10T 442/666; Y10T 428/24124; D04H 13/00; D04H 13/005; D04H 1/498; D04H 1/72; D04H 1/74; D04H 5/06; D04H 3/105; D04H 1/732; D04H 1/485; D04H 5/02; D04H 5/03; D04H 5/022; D04H 5/05; D04H 3/03; D04H 3/04; B29C 20/083; B29C 70/083; B29C 70/506; B29C 70/70; B32B 1/00; B32B 2250/02; B32B 2250/03; B32B 2250/20; B32B 2250/42; B32B 2262/0253; B32B 2262/101; B32B 2262/106; B32B 2262/108; B32B 2307/718; B32B 5/022; B32B 5/06; B32B 5/08; B32B 5/26;
(Continued)

(56) References Cited

U.S. PATENT DOCUMENTS 4,780,363 A   10/1988   Evans et al.
4,931,358 A    6/1990   Wahl et al.
(Continued)

FOREIGN PATENT DOCUMENTS

DE   3941189 A1   6/1990
EP   0323571 A2   7/1989
(Continued)

*Primary Examiner* — Camie S. Thompson
(74) *Attorney, Agent, or Firm* — Brooks Kushman P.C.

(57) ABSTRACT

A planar composite material comprises an UD fiber layer A made of discrete reinforcing fiber rovings and a fiber nonwoven layer B made of a thermoplastic nonwoven which may contain reinforcing fibers, wherein the layers A and B are needled to each other.

23 Claims, 1 Drawing Sheet

(51) Int. Cl.

| | | |
|---|---|---|
| *D04H 1/732* | (2012.01) | |
| *D04H 1/74* | (2006.01) | |
| *D04H 1/498* | (2012.01) | |
| *B29C 70/08* | (2006.01) | |
| *D04H 3/03* | (2012.01) | |
| *D04H 3/04* | (2012.01) | |
| *D04H 3/105* | (2012.01) | |
| *D04H 5/02* | (2012.01) | |
| *D04H 5/03* | (2012.01) | |
| *B32B 5/02* | (2006.01) | |
| *B32B 5/06* | (2006.01) | |
| *B32B 5/08* | (2006.01) | |
| *B32B 1/00* | (2006.01) | |
| *B29C 70/50* | (2006.01) | |
| *D04H 13/00* | (2006.01) | |
| *B32B 37/04* | (2006.01) | |
| *D04H 1/485* | (2012.01) | |

(52) U.S. Cl.
CPC ............... *B32B 5/022* (2013.01); *B32B 5/06* (2013.01); *B32B 5/08* (2013.01); *B32B 37/04* (2013.01); *D04H 1/485* (2013.01); *D04H 1/498* (2013.01); *D04H 1/72* (2013.01); *D04H 1/732* (2013.01); *D04H 1/74* (2013.01); *D04H 3/03* (2013.01); *D04H 3/04* (2013.01); *D04H 3/105* (2013.01); *D04H 5/02* (2013.01); *D04H 5/03* (2013.01); *D04H 13/005* (2013.01); *B32B 2250/02* (2013.01); *B32B 2250/03* (2013.01); *B32B 2250/04* (2013.01); *B32B 2250/20* (2013.01); *B32B 2250/40* (2013.01); *B32B 2250/42* (2013.01); *B32B 2262/0253* (2013.01); *B32B 2262/0261* (2013.01); *B32B 2262/0269* (2013.01); *B32B 2262/101* (2013.01); *B32B 2262/106* (2013.01); *B32B 2262/108* (2013.01); *B32B 2305/20* (2013.01); *B32B 2307/706* (2013.01); *B32B 2307/718* (2013.01); *B32B 2307/738* (2013.01); *B32B 2605/08* (2013.01); *B32B 2605/10* (2013.01); *B32B 2605/18* (2013.01); *Y10T 428/24942* (2015.01)

(58) Field of Classification Search
CPC ............ B32B 2605/08; B32B 2605/10; B32B 2605/18; B32B 2605/20; B32B 5/05; B32B 2250/40; B32B 2262/0269; B32B 2262/0261; B32B 2307/706; B32B 2307/738
USPC ........ 442/387, 327, 373, 381, 388, 392, 488; 428/113, 109, 212; 156/243
See application file for complete search history.

(56) References Cited

U.S. PATENT DOCUMENTS

| | | |
|---|---|---|
| 5,118,550 A | 6/1992 | Baravian et al. |
| 5,910,458 A | 6/1999 | Beer et al. |
| 6,063,717 A * | 5/2000 | Ishiyama ............. D04H 1/4258 28/104 |
| 2008/0026660 A1 | 1/2008 | Ogawa et al. |
| 2012/0148790 A1 | 6/2012 | Chomarat |

FOREIGN PATENT DOCUMENTS

| | | |
|---|---|---|
| EP | 1714772 A1 | 10/2006 |
| GB | 879024 | 10/1961 |
| GB | 2173828 A | 10/1986 |
| GB | 2237583 A | 5/1991 |
| JP | 57-018239 A | 1/1982 |
| JP | 63-175154 A | 7/1988 |
| WO | 2006111037 A1 | 10/2006 |
| WO | 2011/021134 A2 | 2/2011 |

* cited by examiner

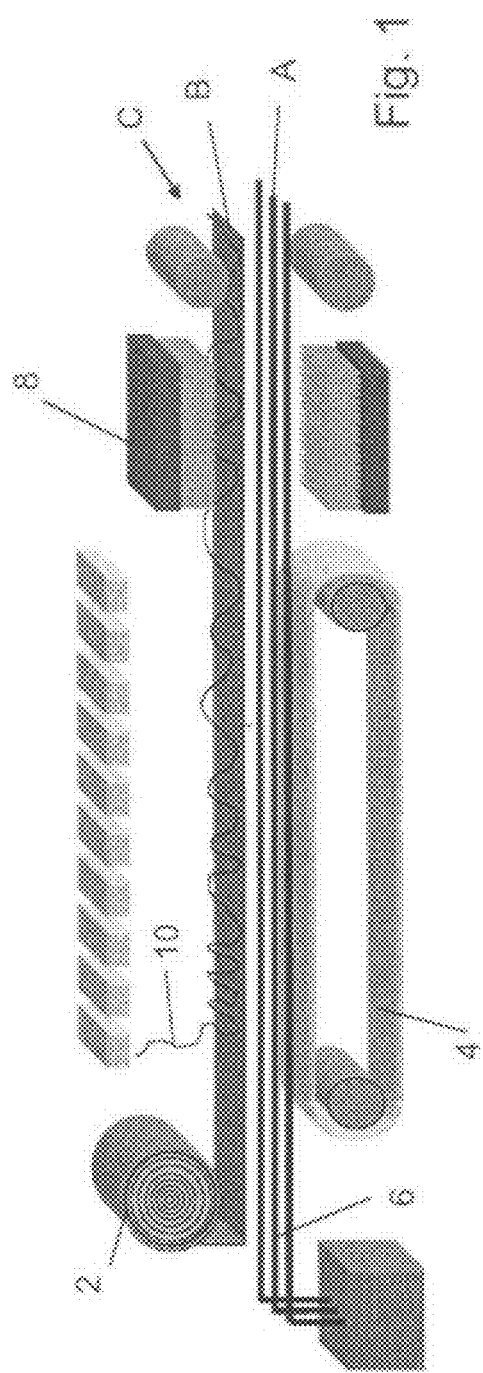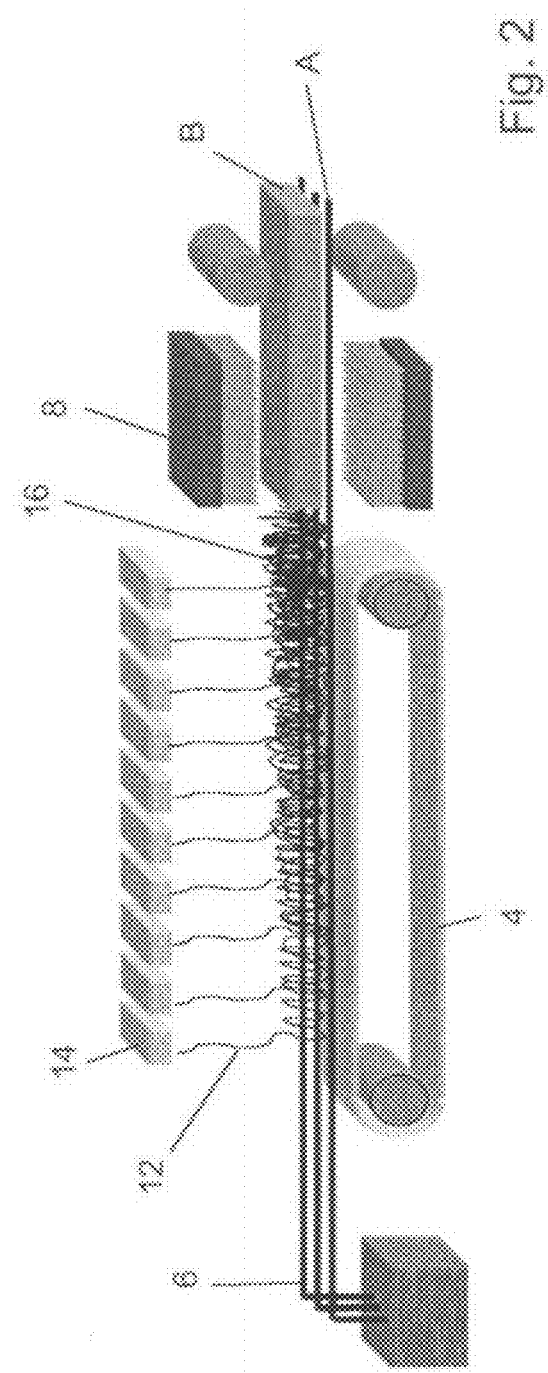

PLANAR COMPOSITE MATERIAL

CROSS-REFERENCE TO RELATED APPLICATIONS

This application is a Continuation of and claims priority to U.S. application Ser. No. 14/383,368, filed Sep. 4, 2014 (now pending), which is the U.S. National Phase of PCT Appln. No. PCT/EP2013/054844 filed Mar. 11, 2013 which claims priority to European Application No. EP 12158958.4 filed Mar. 9, 2012 to which priority is also claimed, and, the disclosures of all of which are incorporated in their entirety by reference herein.

BACKGROUND OF THE INVENTION

1. Field of the Invention

The invention relates to a planar composite material having at least one layer A made of unidirectional reinforcing fiber rovings and at least one layer B made of a thermoplastic fiber nonwoven or a thermoplastic oriented fiber layer which can optionally contain reinforcing fibers, wherein the layers A and B are needled to each other.

2. Description of the Related Art

Thermoplastics are increasingly being used for producing components, particularly components for automobiles, due to their low weight. To provide them with a sufficient rigidity and strength they are usually compounded with reinforcing fibers. For example, planar semifinished products are produced from glass mat reinforced thermoplastics (GMT semifinished products) by merging endless glass fiber mats and thermoplastic molten sheets and consolidating on a double band press. However, this procedure requires a high energy expense because the relatively viscous melt has to be pressed into the mat at pressures far above 1 bar. Moreover, the fiber reinforcement is nondirectional, while in the automotive field reinforcement in one or several preferred directions is particularly desired.

This is the case with the composite material according to WO 2006/111037. Therein, there is described a thermoplastically moldable composite material comprising a fiber nonwoven layer made of thermoplastic fibers and optionally reinforcing fibers and a woven or oriented layer made of reinforcing fibers which are preferably needled to each other. Oriented fiber layers are prefabricated fiber structures in which several layers of unidirectional fiber rovings are tightly and firmly knitted to each other by means of stitching threads. The production of such fiber structures is quite complex and, moreover, the rovings are not sufficiently opened up during needling of the layers due to the tight binding of the rovings by the stitching threads so that they are only insufficiently and irregularly impregnated with the thermoplastic, whereby the mechanical properties of the molded article thus produced are negatively affected.

EP-A 323 571 relates to a fiber reinforced, thermoplastically moldable semifinished product which contains a planar fiber structure that is fixed by needling, consisting of:
at least two layers A made of oriented endless fibers having an areal weight of maximally 300 g/m², and
at least one layer B made of non-oriented fibers.

The textile planar part of EP-A 323 571 preferably contains glass fibers, but other fibers such as carbon fibers and fibers made of aromatic polyamides or other thermoplastics are also mentioned. However, it is not specified whether these thermoplastic fibers may be present in layer A or in layer B or in both layers. For producing the semifinished product, the textile planar part is subjected in a second, separate process step to impregnating with a thermoplastic melt and pressing to a solid semifinished product so that in the subsequent third step the semifinished products can be processed to thermoplastic components. To ensure good impregnation, EP-A 323 571 mandatorily requires that the areal weight of the layer(s) A shall not be greater than 300 g/m².

GB 2 237 583 describes a process for producing a prepreg wherein thermoplastic binding fibers are continuously scattered onto unidirectional reinforcing fibers and consolidated with the same and thereby pressed to a profile part or a planar semifinished product. There is no mention of needling.

It was thus an object of the invention to provide composite materials on the basis of unidirectional fiber rovings that do not have these disadvantages and can directly be processed to molded parts without requiring a separate second process step after production of a textile structure such as required according to EP-A 323 571.

SUMMARY OF THE INVENTION

It has now been found that these and other objects are achieved by directly using—instead of an oriented fiber layer—discrete reinforcing fiber rovings that are not connected to each other (so-called "unidirectional fibers", hereinafter referred to as "UD fibers") and needling these together with a fiber mat with randomly oriented fibers.

BRIEF DESCRIPTION OF THE DRAWINGS

FIG. 1 illustrates one embodiment of a process for forming a composite material of the invention.

FIG. 2 illustrates a further embodiment of a process for forming another composite material of the invention.

DETAILED DESCRIPTION OF THE PREFERRED EMBODIMENTS

Therefore, the subject of the invention is a planar composite material comprising
A. at least one UD fiber layer having an areal weight of more than 300 to 2,000 g/m² made of discrete, unidirectional reinforcing fiber rovings which are not connected to each other, and
B. at least one fiber mat with randomly oriented fibers B having an areal weight of 100 to 2,000 g/m² made of a thermoplastic fiber nonwoven or a thermoplastic oriented fiber layer which can contain up to 70 wt.-% reinforcing fibers,
wherein the layers A and B are needled to each other.

The composite materials of the present invention preferably comprise the layer sequence A-B, but in principle also other layer sequences, for example A-B-A or A-B-A-B, are possible.

In a first, preferred embodiment of the invention, the fiber mat with randomly oriented fibers B consists of a thermoplastic fiber nonwoven, e.g. a needle nonwoven or a nonneedled carding or airlay nonwovens having areal weights of 100 to 2000 g/m², preferably 200 to 1,200 g/m², and particularly 300 to 1,000 g/m². The thermoplastic fiber nonwoven consists preferably of 100% thermoplastic fibers, but it can also contain up to 70 wt.-%, particularly 30 to 70 wt.-% reinforcing fibers. Both the thermoplastic fibers and the reinforcing fibers preferably have a length of 20 to 100 mm.

As thermoplastic fibers of the randomly oriented fiber layer B, any spinnable thermoplastic can be used, but the thermoplastics preferably comprise polypropylene having a MFI (230° C., 2.16 kp) of 25 to 150 g/10 min, particularly unmodified, i.e. polypropylene without carboxyl groups, and also polyamides such as polyamide-6 and polyamide-6,6, but furthermore also linear polyesters, polysulfones, polyketones and polyetherimides. The thermoplastic fibers are intended as "binding fibers", i.e. they should be thermoplastically moldable into a matrix in the course of subsequent processing of the composite material of the present invention.

Preferred reinforcing fibers are glass fibers and carbon fibers, but furthermore also natural fibers and basalt fibers as well as fibers of higher melting thermoplastics such as aramide are suitable. In the present context, the term "high melting" is to be understood in relation to the thermoplastic fibers that are provided as binding fibers, i.e. for the formation of a polymer matrix. In particular, the melting or softening point of the reinforcing fibers in the randomly oriented fiber layer B shall be significantly higher, for example at least 50° C. higher, than that of the thermoplastic fibers.

In addition, the composite material can contain a relatively thin fiber layer C made of nondirectional reinforcing fibers having an areal weight of 50 to 500 g/m$^2$, preferably of 100 to 300 g/m$^2$ on the side of layer B which is facing away from layer A, thus resulting in a layer sequence A-B-C. This layer C provides an additional reinforcement of the composite material, which becomes important when a fiber nonwoven having a relatively low areal weight is used. Glass fibers or carbon fibers are particularly useful as nondirectional fibers.

In a second embodiment, the fiber mat with randomly oriented fibers B consists of a thermoplastic oriented fiber layer with endless thermoplastic fibers which optionally can also contain endless reinforcing fibers. Preferred thermoplastic fibers are polypropylene fibers with a titer of 600 to 2,400 dtex, which can be finished with generally known stabilizers and adhesion promoters.

It is preferred for the composite material to comprise exclusively layers A and B, and optionally C, but no further layers of other type.

The composite material of the present invention preferably contains 30 to 80 wt.-%, particularly 50 to 70 wt.-% UD fibers. Its areal weight is preferably more than 400 to 4,000 g/m$^2$, particularly 1,000 to 1,000 g/m$^2$. In the non-consolidated state the thickness is preferably 5 to 15 mm.

The reinforcing fiber rovings are, for example, glass, carbon, aramide or basalt fibers with a titer of preferably 100 to 4,800 tex, particularly 200 to 3,000 tex. Particularly preferred are carbon fibers. Composite materials on this basis have a particularly high rigidity in the longitudinal direction and a very good flexibility. The areal weight of the layer A is more than 300 to 2,000 g/m$^2$, preferably 350 to 2,000 g/m$^2$. Components that are produced from composite materials with relatively heavy UD fibers exhibit better strengths than those produced with light UD fibers as described, for example, in EP-A 323 571. Moreover, such heavier composite materials, particularly if they have only two layers A-B, can be better handled than lighter ones.

Particularly preferred composite materials contain carbon fibers as the UD fibers, and the fiber nonwoven layer contains a polyamide, particularly polyamide-6, as the thermoplastic, and also 30 to 70 wt.-% carbon fibers. For this purpose, it is advantageous to use recycled carbon fibers which, for example, were obtained by means of known recycling methods from crushed, finished parts reinforced with carbon fibers. Such composite materials have a good temperature resistance.

An implementation of the method for producing composite materials according to the first embodiment is shown in FIG. 1 as a perspective view. Initially, a fiber nonwoven layer is produced according to the carding or airlay method and needled to form a needle nonwoven 2. The UD fibers 6 are initially laid out next to each other on a circulating endless band (4), preferably as closely to each other as possible, thereby forming a layer A. Thereupon, the prefabricated needle nonwoven 2 is then continuously laid out to form a layer B, and the two layers A, B are then needled to each other in a needling device 8.

It is also possible to lay out a nonwoven produced according to the airlay or carding method directly onto the UD fibers without needling, and to needle thereafter only.

If the composite material shall contain further layers A or B, respectively, the corresponding webs can be additionally fed and needled.

If the composite material shall additionally contain a thin layer C, the randomly oriented fibers 10 of the layer C are arranged as endless mats onto the fiber nonwoven of the upper layer B or scattered thereon as chopped fibers. All the three layers are then needled to each other. This is schematically shown in FIG. 1.

FIG. 2 shows in a perspective view a further implementation of the method for producing composite materials according to the second embodiment. The UD fibers 6 of layer A are initially laid out on a circulating endless band 4, then the thermoplastic fibers 12 and optionally also reinforcing fibers from traversing feeders 14 are laid out thereon by formation of an oriented fiber layer 16 corresponding to layer B, and the layers A, B are subsequently needled to each other in a needling device 8. This is schematically shown in FIG. 2.

The composite materials of the present invention can be cut into thin plates. These pre-cut parts can then be directly processed into three-dimensional components by pressing them in a mold at temperatures above the softening point of the thermoplastic of the randomly oriented fiber layer B. However, also a semifinished product can be produced by continuously consolidating the planar composite material web e.g. on a double band press at temperatures above the softening point of the thermoplastic of the randomly oriented fiber layer B and at pressures of 0.5 to 5 bar. Pressing on laminating devices is also possible. The consolidated semifinished product preferably has a thickness of 0.3 to 5.0 mm, particularly 1.0 to 3.0 mm. It is also possible to use pre-cut parts made of the composite materials for specific reinforcement of fiber composite molded parts by inserting these into a mold together with e.g. GMT or NMT semifinished products (i.e. semifinished products on the basis of glass mat reinforced or natural fiber mat reinforced thermoplastics) and needling together with the same. It should be evident, as disclosed previously, that when a layer is initially formed from continuous fibers and subsequently needled, all or a large number of such fibers will no longer be continuous or natural, "continuous" refers to the initial state of the fibers, prior to needling.

The finished parts which are produced from the composite materials of the present invention are very lightweight and highly rigid. They can be used as automobile parts, for sporting goods, for railway wagon construction and for aircraft construction.

The invention claimed is:

1. A continuous method for producing a moldable fiber-reinforced thermoplastic matrix composite material having an areal weight of at least 400 g/m², comprising arranging discrete UD reinforcing fiber rovings parallel to each other on a circulating endless band to constitute an unconsolidated layer A, laying a fiber nonwoven layer B comprising from 30 to 100% by weight thermoplastic matrix fibers based on the weight of nonwoven layer B thereon, and subsequently needling layers A and B to each other, wherein the UD reinforcing fibers have a melting point which is at least 50° C. higher than the melting point of the thermoplastic matrix fibers.

2. The method of claim 1, wherein the fibers of the UD reinforcing fiber rovings are selected from the group consisting of carbon fibers, glass fibers, aramid fibers, basalt fibers, or mixtures thereof.

3. The method of claim 2, wherein the thermoplastic matrix fibers comprise polypropylene fibers, polyamide fibers, linear polyester fibers, polysulfone fibers, polyketone fibers, or polyetherimide fibers.

4. A process for producing components, comprising pressing a pre-cut part comprising a composite material produced by the method of claim 3 together with a GMT or NMT semifinished product in a mold at a temperature above the softening point of the thermoplastic of randomly oriented fiber layer B, and consolidating under pressure.

5. The method of claim 2, wherein the fibers of the UD reinforcing fiber roving comprise carbon fibers, and the thermoplastic matrix fibers comprise polyamide fibers, wherein layer B further contains from 30-70 weight percent of carbon fibers.

6. The method of claim 5, wherein the carbon fibers in layer B are recycled carbon fibers from crushed carbon fiber reinforced finished parts.

7. A process for producing components, comprising pressing a pre-cut part comprising a composite material produced by the method of claim 5 together with a GMT or NMT semifinished product in a mold at a temperature above the softening point of the thermoplastic of randomly oriented fiber layer B, and consolidating under pressure.

8. A process for producing components, comprising pressing a pre-cut part comprising a composite material produced by the method of claim 2 together with a GMT or NMT semifinished product in a mold at a temperature above the softening point of the thermoplastic of randomly oriented fiber layer B, and consolidating under pressure.

9. The method of claim 1, wherein the fibers of the UD reinforcing fiber rovings are selected from the group consisting of carbon fibers, glass fibers, basalt fibers, or mixtures thereof.

10. The continuous method of claim 1, wherein prior to needling, a nondirectional reinforcing fiber layer C having an areal weight of 50-500 g/m² is laid onto layer B, and subsequently the layers A, B and C are needled to each other.

11. The continuous method of claim 1, comprising arranging the UD fiber rovings of layer A on a circulating endless band, laying endless fibers onto layer A from traversing feeders to form a layer B, and subsequently needling layers A and B to each other, wherein the endless fibers of layer B comprise endless thermoplastic fibers and optionally endless reinforcing fibers.

12. The continuous method of claim 1, wherein layer B comprises a needled mat prior to layers A and B being needled together.

13. The continuous method of claim 1, wherein the discrete UD reinforcing fiber rovings have a titer of from 200 to 3000 tex.

14. The continuous method of claim 1, wherein the moldable thermoplastic matrix composite comprises from 30 to 80 wt. % of UD reinforcing fiber based on the total weight of the composite.

15. The continuous method of claim 1, wherein following needling of layers A and B to each other, the moldable thermoplastic matrix composite has a thickness of from 5 to 15 mm.

16. The continuous method of claim 1, further comprising heating the moldable thermoplastic matrix composite to a temperature above the melting point of the thermoplastic fibers and at least partially consolidating under a pressure of from 0.5 to 5 bar in a double band press to produce a semifinished product with a thickness of from 0.3 to 5 mm.

17. The method of claim 1, wherein the areal weight of layer A is from 350 g/m² to 2000 g/m².

18. The method of claim 1, wherein layer B contains no reinforcing fibers.

19. The method of claim 1, containing 50-80 wt. % of unidirectional fibers from layer or layers A, based on the weight of the planar composite material.

20. The method of claim 1, wherein the moldable thermoplastic matrix composite has an areal weight of from 1000 g/m² to 4000 g/m².

21. A process for producing components, comprising pressing a pre-cut part comprising a composite material produced by the method of claim 1 together with a GMT or NMT semifinished product in a mold at a temperature above the softening point of the thermoplastic of randomly oriented fiber layer B, and consolidating under pressure.

22. A planar composite material which is thermoformable to produce an oriented fiber reinforced thermoplastic matrix composite prepared by the method of claim 1, comprising a needled product of:
   a) at least one UD fiber layer A of discrete, unidirectional reinforcing fiber rovings which are not connected to each other, layer A having an areal weight of more than 300 g/m² and up to 2,000 g/m² and
   b) at least one thermoplastic fiber mat B containing randomly oriented fibers, layer B having an areal weight of 100 to 2,000 g/m², and comprising a thermoplastic fiber nonwoven or a thermoplastic oriented fiber layer, each of which layer(s) B optionally contain up to 70 wt.-% of reinforcing fibers, said thermoplastic fiber nonwoven or thermoplastic oriented fiber layer B comprising fibers of a thermoplastic material having a melting or softening point at least 50° C. lower than that of any reinforcing fibers of layers A and B.

23. The composite material of claim 22, comprising 30 to 80 wt.-% UD fibers based on the total weight of the composite material.

* * * * *